(12) United States Patent
Watson et al.

(10) Patent No.: US 10,760,600 B2
(45) Date of Patent: Sep. 1, 2020

(54) METHOD OF APPLYING RIBLETS TO AN AERODYNAMIC SURFACE

(71) Applicant: GENERAL ELECTRIC COMPANY, Schenectady, NY (US)

(72) Inventors: Sarah Colleen Watson, Blue Ash, OH (US); Elzbieta Kryj-Kos, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/795,722

(22) Filed: Oct. 27, 2017

(65) Prior Publication Data
US 2019/0128296 A1 May 2, 2019

(51) Int. Cl.
*F15D 1/00* (2006.01)
*B64C 21/10* (2006.01)
*F01D 5/14* (2006.01)

(52) U.S. Cl.
CPC ............ *F15D 1/0035* (2013.01); *B64C 21/10* (2013.01); *F01D 5/147* (2013.01); *F15D 1/0085* (2013.01); *F05D 2220/32* (2013.01); *F05D 2230/90* (2013.01); *F05D 2240/31* (2013.01)

(58) Field of Classification Search
CPC ....... B64C 21/10; F03D 1/065; F03D 1/0675; F01D 5/14–141; F15D 1/0035–0045
USPC .................................................... 416/236 R
See application file for complete search history.

(56) References Cited

U.S. PATENT DOCUMENTS

| 4,706,910 | A | 11/1987 | Walsh et al. |
| 4,986,496 | A * | 1/1991 | Marentic .................. B05D 5/02 244/130 |
| 5,133,519 | A | 7/1992 | Falco |
| 5,386,955 | A | 2/1995 | Savill |
| 5,803,409 | A | 9/1998 | Keefe |
| 6,290,895 | B1 | 9/2001 | Wang et al. |
| 7,070,850 | B2 * | 7/2006 | Dietz ...................... B32B 27/08 428/172 |
| 8,684,310 | B2 | 4/2014 | Rawlings et al. |
| 9,481,451 | B2 | 11/2016 | Rawlings et al. |
| 10,450,867 | B2 * | 10/2019 | Bunker ................ F04D 29/324 |
| 2008/0268258 | A1 * | 10/2008 | Verma ..................... F03D 1/065 428/421 |
| 2011/0262705 | A1 * | 10/2011 | Gupta ..................... B64C 21/10 428/156 |
| 2013/0146217 | A1 * | 6/2013 | Kray ....................... B64C 21/10 156/210 |
| 2016/0243586 | A1 | 8/2016 | Travis |
| 2016/0271930 | A1 | 9/2016 | Roper et al. |
| 2016/0312035 | A1 | 10/2016 | Song |
| 2016/0318603 | A1 | 11/2016 | Rawlings et al. |

(Continued)

*Primary Examiner* — Erick R Solis
*Assistant Examiner* — Robert A Werner
(74) *Attorney, Agent, or Firm* — McGarry Blair PC (57) ABSTRACT

This disclosure relates to a method and resulting apparatus of applying a riblet sheet comprising a riblet film layer and a riblet liner layer on an airfoil surface. The method comprises applying the riblet film layer of the riblet sheet over the airfoil surface, peeling back at least a portion of the riblet liner layer from the riblet film layer to expose a portion of the riblet film layer, applying a attaching hardware or a non-textured surface film over at least a portion the riblet film layer portion; and applying the peeled back portion of the riblet liner layer over a portion of the attaching hardware.

22 Claims, 5 Drawing Sheets

(56) References Cited

U.S. PATENT DOCUMENTS

2017/0100877 A1    4/2017  Song
2017/0137116 A1*  5/2017  Ireland .................... F15D 1/003
2017/0167510 A1*  6/2017  Berschback ............ F01D 5/141

* cited by examiner

METHOD OF APPLYING RIBLETS TO AN AERODYNAMIC SURFACE

BACKGROUND OF THE INVENTION

Surfaces of aircraft including the body, wings, nacelle, and engine or other structures with aerodynamic properties can be subject to environmental erosion conditions that can degrade the performance and durability of the structure. These surfaces can be modified to contain microscopic geometric features such as riblet formations for aerodynamic performance enhancement, erosion protection, and other reasons.

Riblet formations can be provided on or applied to an aircraft surface such as an airfoil surface in a variety of manners for improving the aerodynamic properties the surface and for withstanding erosive conditions.

BRIEF DESCRIPTION OF THE INVENTION

In one aspect, embodiments of the invention relate to a method of applying a riblet sheet comprising a riblet film layer and a riblet liner layer on an airfoil surface. The method comprises the step of applying the riblet film layer of the riblet sheet over the airfoil surface, peeling back at least a portion of the riblet liner layer from the riblet film layer to expose a portion of the riblet film layer, applying a attaching hardware or a non-textured surface film over at least a portion the riblet film layer portion; and applying the peeled back portion of the riblet liner layer over a portion of the attaching hardware.

In another aspect, embodiments of the invention relate to a turbine engine comprising an airfoil having an outer surface defining a pressure side and a suction side and extending axially between a leading edge and a trailing edge defining a chord-wise direction and extending radially between a pair of end walls defining a span-wise direction. At least a portion of the outer surface comprises a riblet sheet that has a riblet film layer and a riblet liner layer extending from the trailing edge toward the leading edge. The outer surface also comprises an attaching hardware or non-textured surface film extending from the leading edge toward the trailing edge. At least a portion of the attaching hardware or non-textured surface film partially covers at least a portion of the riblet film layer, and is partially covered by at least a portion of the riblet liner layer.

In yet another aspect, embodiments of the invention relate to an airfoil comprising an outer surface that defines a first side and a second side and extends axially between a leading edge and a trailing edge which defines a chord-wise direction and extends radially between a pair of end walls which defines a span-wise direction. At least a portion of the outer surface comprises a riblet sheet having a riblet film layer and a riblet liner layer extending from the trailing edge toward the leading edge. The outer surface also comprises an attaching hardware or non-textured surface film extending from the leading edge toward the trailing edge. At least a portion of the attaching hardware or non-textured surface film partially covers at least a portion of the riblet film layer, and is partially covered by at least a portion of the riblet liner layer.

DESCRIPTION OF EMBODIMENTS OF THE INVENTION

The described embodiments of the present disclosure are directed to a method and resulting structure associated with applying a riblet sheet having riblet formations to an aerodynamic surface to improve aerodynamic performance and withstand erosive conditions. Applications for the present disclosure could be used in aircraft application, energy and wind applications, or any environment having aerodynamic surfaces. In aircraft, riblet sheets can be applied to surfaces such as airfoils, including but not limited to fan blades, outlet guide vanes, propellers, and other aerodynamic structures where there is air flow around the surface. Applying the riblet sheet in an appropriate manner can help mitigate lumps, wrinkles, and high seams in the final application on the surface that could negatively affect aerodynamic performance.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
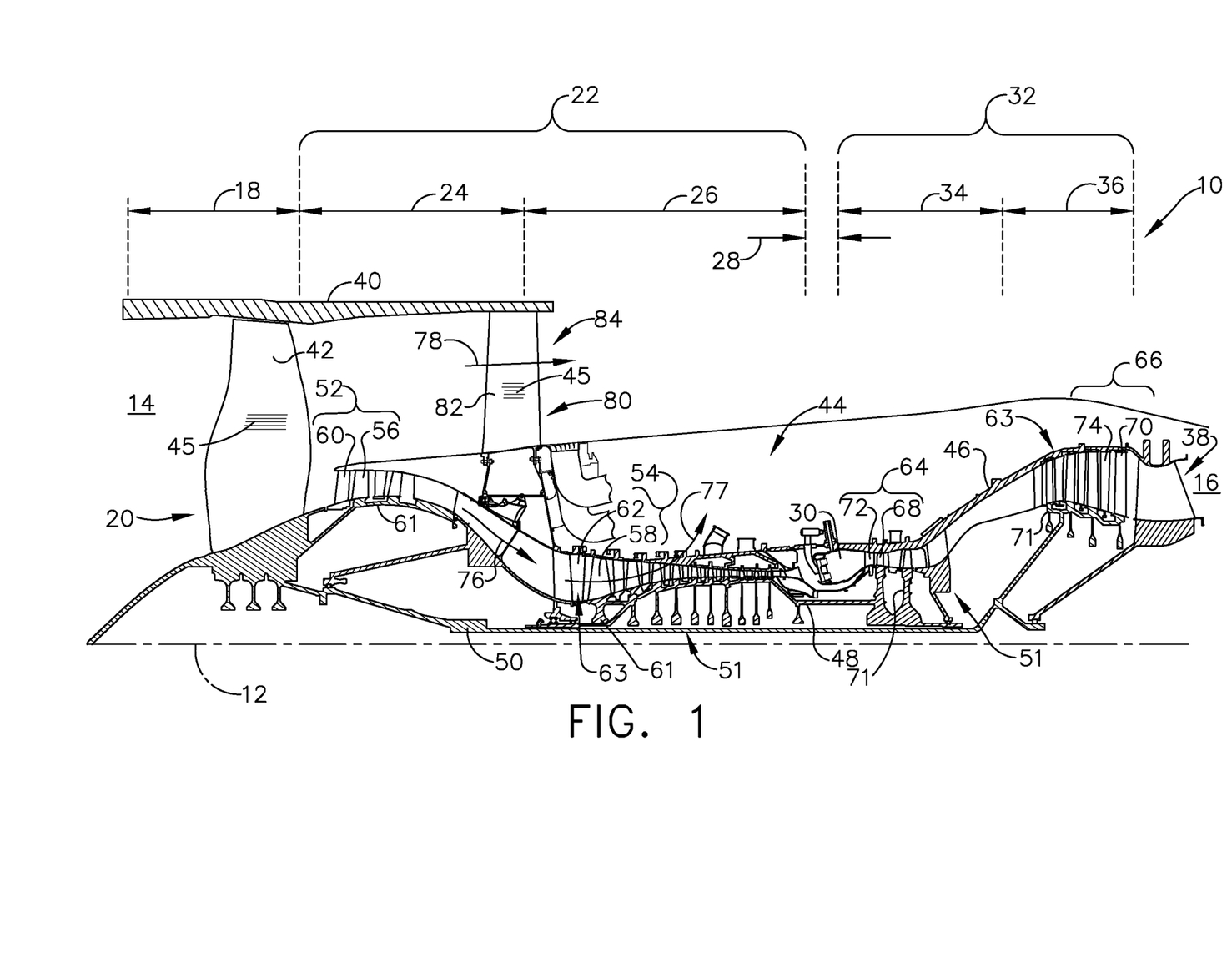
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. A riblet formation 45 can be positioned on all or a portion of the surface of one or more fan blades 42 to improve the performance characteristics for airflow across the fan blades 42. At the fan exhaust side 84, an outlet guide vane assembly 80 can be provided that comprises a plurality of airfoil guide vanes 82. The outlet guide vanes 82 are utilized adjacent the fan section 18 to exert some directional control of the airflow 78 as it exits the fan section. The outlet guide vanes 82 can also be provided with riblet formations 45 on all or a portion of the surfaces of the guide vanes 82 to help improve aerodynamic performance. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

Figure 2:
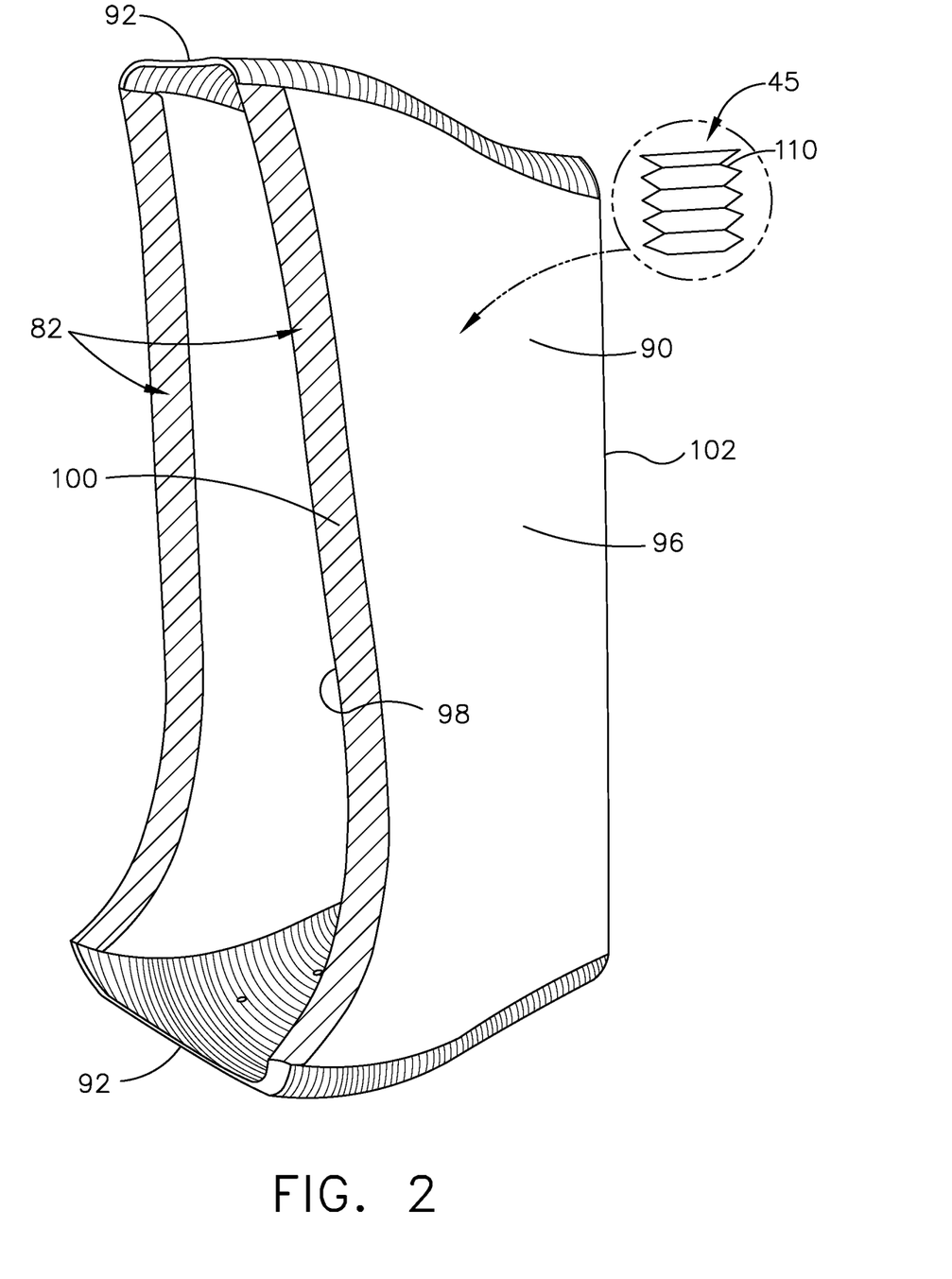
FIG. 2 is a perspective view of an airfoil in the form of a pair of outlet guide vanes constructed as single unit in accordance with the present disclosure.

FIG. 2 depicts a pair of exemplary outlet guide vanes 82 constructed as a single unit in accordance with the present invention. Each outlet guide vane 82 includes a body 90 connected by end-walls 92 located at each end of the body 90. Each outlet guide vane 82 also comprises an airfoil cross-section defined by a pressure side 96, an opposing suction side 98, a leading edge 100, and a trailing edge 102, with the body 90 extending between the end-walls 92 and between the leading edge 100 and trailing edge 102. The body 90 can be constructed from polymer materials such as polymer matrix composite (PMC), metallic materials, ceramic materials, or combinations thereof that will withstand the necessary heat and operating loads of a turbine engine environment.

The outer body 90 can be modified to include microscopic riblet formations 45 across all or a portion of the body 90 (shown blown-up in FIG. 2). The riblet formations 45 can generally comprise a plurality of contiguous geometric features 110 such as a sawtooth profile or peak-and-valley profile. The riblet formation 45 can extend across all or a portion of the body 90 any be located anywhere between the end-walls 92. It should be understood that other contiguous geometric shapes may alternatively be used. The riblet formations 45 typically do not contribute to the overall structural integrity of the outlet guide vanes 82.

Figure 3:
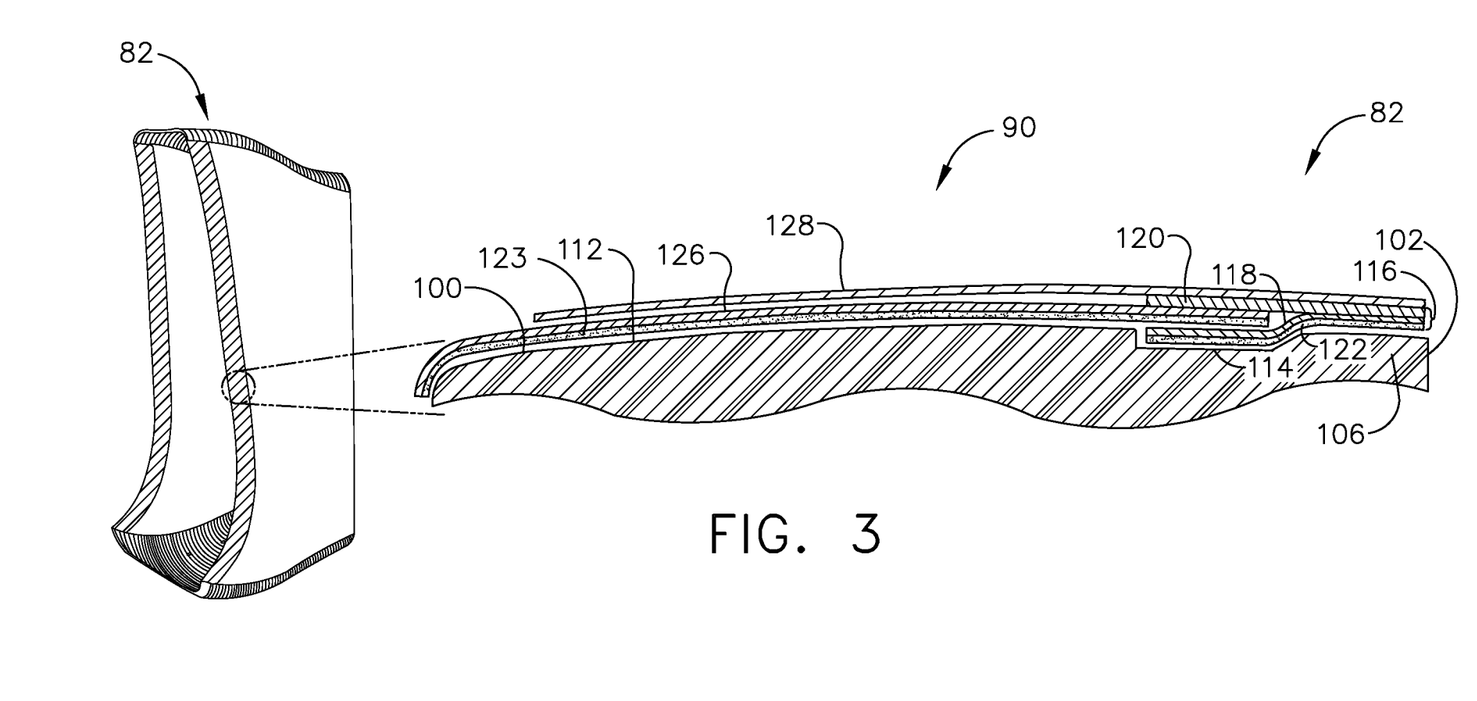
FIG. 3 is a cross-section of the airfoil such as an outlet guide vane illustrating a riblet sheet covering an outer surface of the guide vane.

FIG. 3 illustrates one possible cross-section of the body 90 of the outlet guide vane 82, with the leading edge 100 being primarily shown. The body 90 can have an inner structure 106 defined by the leading edge 100, trailing edge 102, and a structural outer surface 112 extending therebetween. The structural outer surface 112 of the body 90 can generally be flat, slightly convex, or slightly concave. As illustrated, the structural outer surface 112 of the body 90 is slightly convex with an indentation 114 provided proximate the leading edge 100.

The riblet sheet 116 can be comprised of a riblet film layer 118 and a riblet liner layer 120. The riblet film layer 118 carries the contiguous geometric features 110 associated with the riblet formation 45 and the riblet liner layer 120 carries a negative image of the contiguous geometric features 110 so it can bond to overlay the riblet film layer 118 without damaging or altering the geometric features 110 that define riblet formations 45. It is contemplated that riblet sheet 116 can be made as single sheet comprising both the riblet film layer 118 and the riblet liner layer 120. In other embodiments, the riblet film layer 118 and the riblet liner layer 120 can be made as separate sheets and applied individually to the structural outer surface 112 in the riblet sheet 116 application process. It has been found that the contiguous geometric features 110 that define the riblet formations 45 are better preserved during a cure cycle when the riblet film layer 188 is cured with the riblet liner layer 120 in place.

While it is contemplated that the riblet film layer 118 can be made from polyurethane and the riblet liner layer 120 can be made from polypropylene, the composite riblet sheet 116 and accompanying contiguous geometric features 110 can be made of any material which will withstand the expected loads and temperatures during operation and which can be formed to the desired profile. In addition, the riblet liner layer 120 must also maintain dimensional stability during the adhesive cure cycle.

The riblet sheet 116 can extend from the trailing edge 102 across at least a portion of the body 90 and can terminate in the indentation 114. In other words, it is contemplated that the riblet sheet 116 extends from the trailing edge 102 to the indentation 114 and between the end-walls 92, thereby covering all but the leading edge 100 of the outlet guide vane body 90. While there are many ways to attach the riblet sheet 116 to the body 90, one exemplary way is by applying an adhesive layer 122 to the bottom surface of the riblet film layer 118 and adhering the riblet sheet 116 to the structural outer surface 112.

Extending from the leading edge 100 toward the indentation 114 can be an attaching hardware 126 such as a metal leading edge or other material protecting or otherwise covering the leading edge 100. The attaching hardware 126 can extend around at least a portion of the leading edge 100 and further extend from the leading edge 100 toward the indentation 114 and cover or overlap at least a portion of riblet film layer 118. Similar to the riblet film layer 118, the attaching hardware 126 can further comprise an adhesive layer 123 for adhering the attaching hardware 126 to the structural outer surface 112. If applying a riblet sheet 116, comprised of a riblet film layer 118 and a riblet liner layer 120 with an adhesive there between, the riblet liner layer 120 can be manually separated and hinged back from the riblet film layer 118. This allows the attaching hardware 126 to be applied over and cover at least a portion of the riblet film layer 118. It also allows the riblet liner layer 120 to be applied over and cover at least a portion of attaching hardware 126. A caul sheet 128 can cover or overlap both the attaching hardware 126 and riblet liner 120. Caul sheets 128 are used to apply even pressure to the surface during the adhesive cure cycle. Once all the layers are applied over the structural outer surface 112 of the body 90, the body 90 can be vacuumed packed to draw all the layers tightly together before curing. It should be recognized that not all airfoil applications include an attaching hardware 126. In these applications, a non-textured or smooth sheet or film can be substituted without departing from the scope of the disclosure.

Figure 4:
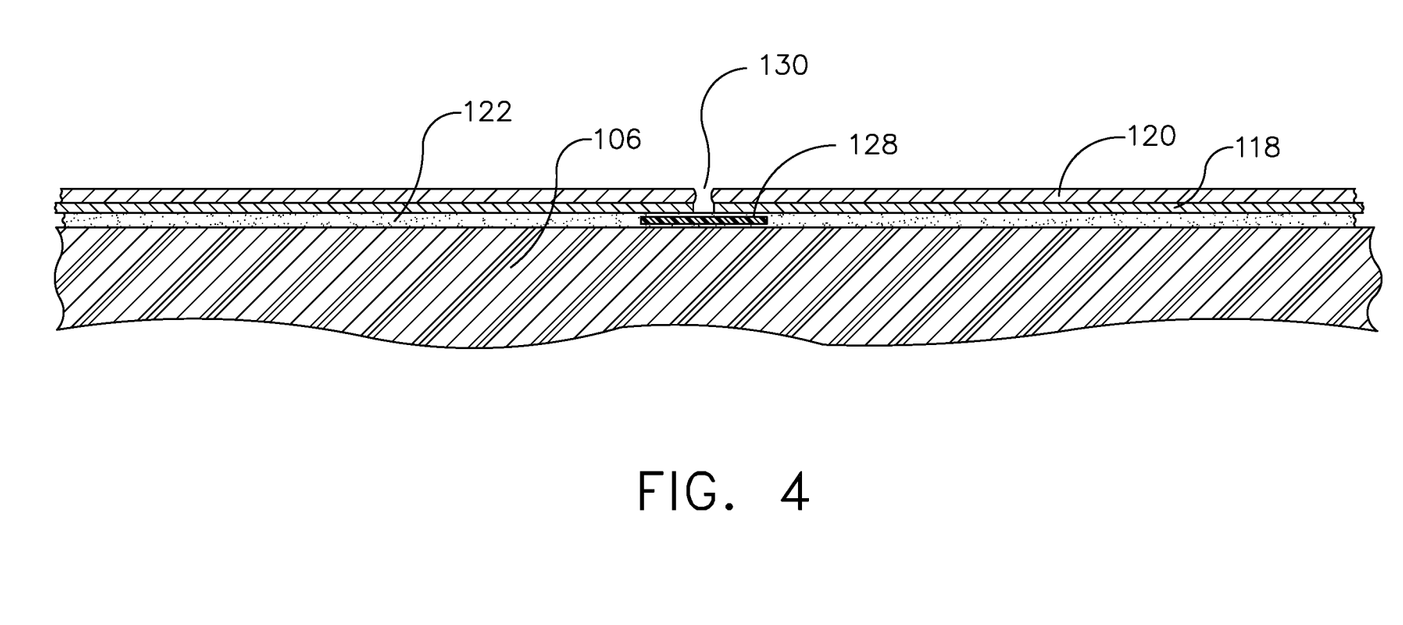
FIG. 4 is an exemplary view of two riblet sheets spliced together.

FIG. 4 illustrates two or more riblet sheets 116 where the number and location of the riblet sheets 116 may be varied to suit a particular application. In particular, in some situations, one riblet sheet 116 may not be of sufficient length or width to cover a desired surface area. In these cases, it may take multiple riblet sheets 116 applied adjacent to one another to cover the desired surface area. In applying adjacent riblet sheets 116, each riblet sheet 116 can be oriented such that aerodynamic properties are optimized. To create a smooth transition between adjacent riblet sheets 116, a piece of smooth or untextured film 129 can be positioned under the gap 130 defined between the adjacent sheets 116. Such placement can help prevent adhesive leakage in the gap 130.

Figure 5:
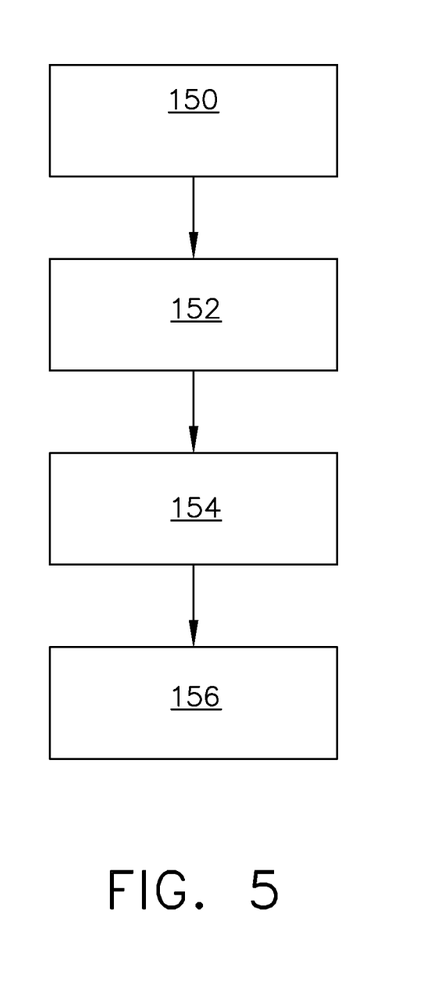
FIG. 5 is a flow chart of a method of applying a riblet sheet to an airfoil surface such as an outlet guide vane.

Turning to FIG. 5, a method of applying a riblet sheet to an airfoil surface is illustrated. The method comprises the step 150 of applying a riblet sheet 116 comprising a riblet film layer 118 and a riblet liner layer 120 to a structural outer surface 112 of an airfoil body 90. The riblet sheet 116 can comprise an adhesive layer 122 disposed adjacent the riblet film layer 118 for adhering the riblet sheet 116 to the structural outer surface 112 of the body 90. The riblet sheet 116 carries contiguous geometric features 110.

The next step 152 is separating the riblet liner layer 120 from the riblet film layer 118 at the indentation 114 on the structural outer surface 112. The riblet liner layer 120 can be peeled off edge from the riblet film layer 118 by locally peeling, bending or hinging the riblet liner layer 120 back from the riblet film layer 118. It should also be recognized a portion of the riblet liner layer 120 could be removed or detached from the from the riblet film layer 118.

The next step 154 is applying an attaching hardware 126 or non-textured or smooth surface film from the leading edge 100 to cover or overlap the riblet film layer 118 at the indentation 114. The attaching hardware 126 or non-textured surface film can comprise an adhesive layer 124 for adhering the attaching hardware 126 or non-textured surface to the structural outer surface 112 of the body 90.

The next step 156 is re-applying the peeled back riblet film layer 118 over the attaching hardware 126 or non-textured surface film.

In addition, in the situation that multiple riblet sheets 116 are positioned adjacent to each other such that a seam or gap 130 is formed between adjacent riblet sheet sides 116, a strip of non-textured film may be applied under the joint or gap 130 to help prevent adhesive from seeping through the gap 130.

Finally, a caul sheet 128 can be applied over the attaching hardware 126 and riblet liner layer 120 prior to curing the adhesive.

It should be appreciated that application of the disclosed design is not limited to turbine engines with a fan section, but is applicable to turbojets, turbo engines, and other aerodynamic structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of applying a riblet sheet comprising a riblet film layer and a riblet liner layer on an aerodynamic surface comprising:
    applying the riblet film layer of the riblet sheet over the aerodynamic surface;
    peeling back at least a portion of the riblet liner layer from the riblet film layer to expose a portion of the riblet film layer;
    applying an attaching hardware or a non-textured surface film over at least a portion the riblet film layer portion; and
    applying the peeled back portion of the riblet liner layer over a portion of the attaching hardware or the non-textured surface film or removing the peeled back portion from the riblet sheet.

2. The method of claim 1 further comprising curing the riblet film layer in place with the riblet liner layer.

3. The method of claim 1 wherein applying of the riblet sheet further comprises applying multiple riblet sheets comprising contiguous geometric features adjacent to each other.

4. The method of claim 3 further comprising aligning the contiguous geometric features on the multiple riblet sheets.

5. The method of claim 4 further comprising applying a smooth erosion film underneath at least a portion of adjacent riblet film sheets.

6. The method of claim 1 further comprising applying a caul sheet over at least a portion of the attaching hardware or non-textured surface film and riblet liner.

7. The method of claim 1 further comprising adhering the riblet sheet to at least a portion of the aerodynamic surface with an adhesive.

8. The method of claim 1 further comprising locating an edge of the riblet film layer in an indentation on the aerodynamic surface.

9. The method of claim 1 wherein the riblet liner layer overlaps at least a portion of the attaching hardware or non-textured surface film and the riblet film layer.

10. The method of claim 1 wherein the aerodynamic surface is one of an outlet guide vane or fan blade.

11. A turbine engine comprising:
an airfoil having an outer surface defining a pressure side and a suction side and extending axially between a leading edge and a trailing edge defining a chord-wise direction and extending radially between a pair of end walls defining a span-wise direction; at least a portion of the outer surface comprising:
a riblet sheet having a riblet film layer and a riblet liner layer extending from the trailing edge toward the leading edge;
a leading edge or non-textured surface film extending from the leading edge toward the trailing edge wherein at least a portion of the leading edge or non-textured surface film partially covers at least a portion of the riblet film layer, and is partially covered by at least a portion of the riblet liner layer.

12. The turbine engine of claim 11 wherein the riblet sheet comprises a plurality of contiguous geometric features.

13. The turbine engine of claim 12 wherein the plurality of contiguous geometric features comprises a plurality of parallel peaks and valleys.

14. The turbine engine of claim 12 wherein the riblet liner comprises a negative image of the contiguous geometric features.

15. The turbine engine of claim 11 wherein the riblet sheet further comprises an adhesive layer coupled to the riblet film layer for adhering the riblet film layer to the airfoil surface.

16. The turbine engine of claim 15 further comprising a caul layer overlapping at least a portion of the leading edge or non-textured surface film and the riblet film layer during adhesive cure.

17. The turbine engine of claim 11 wherein the airfoil is one of an outlet guide vane or fan blade.

18. The turbine engine of claim 11 wherein the riblet liner layer is made from polypropylene.

19. The turbine engine of claim 11 wherein the riblet film layer is made from polyurethane.

20. An airfoil comprising:
an outer surface defining a first side and a second side and extending axially between a leading edge and a trailing edge defining a chord-wise direction and extending radially between a pair of end walls defining a span-wise direction; at least a portion of the outer surface comprising:
a riblet sheet having a riblet film layer and a riblet liner layer extending from the trailing edge toward the leading edge;
an attaching hardware or non-textured surface film extending from the leading edge toward the trailing edge wherein at least a portion of the attaching hardware or non-textured surface film partially covers at least a portion of the riblet film layer, and is partially covered by at least a portion of the riblet liner layer.

21. The airfoil of claim 20 wherein the riblet sheet further comprises an adhesive layer coupled to the riblet film layer for adhering the riblet film layer to the outer surface.

22. The airfoil of claim 20 wherein the riblet liner layer is made from polypropylene and the riblet liner layer is made from polypropylene.

* * * * *